United States Patent
McCool et al.

(10) Patent No.: US 6,466,888 B1
(45) Date of Patent: Oct. 15, 2002

(54) NEURAL NETWORK SYSTEM FOR ESTIMATION OF AIRCRAFT FLIGHT DATA

(75) Inventors: Kelly McCool, University Park, MD (US); David Haas, North Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/383,624

(22) Filed: Aug. 26, 1999

(51) Int. Cl.$^7$ .............................................. G06F 15/00
(52) U.S. Cl. ........................................ 702/144; 706/17
(58) Field of Search ................................ 702/144, 145, 702/151, 189; 706/17; 700/45; 701/124, 16; 703/2

(56) References Cited

U.S. PATENT DOCUMENTS

| | | | |
|---|---|---|---|
| 5,034,896 A | * | 7/1991 | Orgun et al. ............... 701/124 |
| 5,180,911 A | | 1/1993 | Grossman et al. |
| 5,649,064 A | | 7/1997 | Jorgensen et al. |
| 5,751,609 A | * | 5/1998 | Schaefer, Jr. et al. ....... 702/144 |
| 5,890,101 A | * | 3/1999 | Schaefer, Jr. et al. ....... 702/144 |
| 5,901,272 A | * | 5/1999 | Schaefer, Jr. et al. ......... 706/17 |
| 6,092,919 A | * | 7/2000 | Calise et al. .................. 700/45 |

* cited by examiner

Primary Examiner—Marc S. Hoff
Assistant Examiner—Mohamed Charioui
(74) Attorney, Agent, or Firm—Jacob Shuster

(57) ABSTRACT

Input parameters which correspond to operational flight data of an aircraft within a predetermined flight domain, are defined through measured variable state parameters generated during aircraft flight, utilizing a neural network trained by exemplars corresponding to such variable state parameters and reference information on the aircraft for data processing of real time values of the variable state parameter measurement to calculate values of the input parameters and provide a corresponding output as a reliable estimate of aircraft flight data such as airspeed, sideslip and angle of attack.

7 Claims, 5 Drawing Sheets

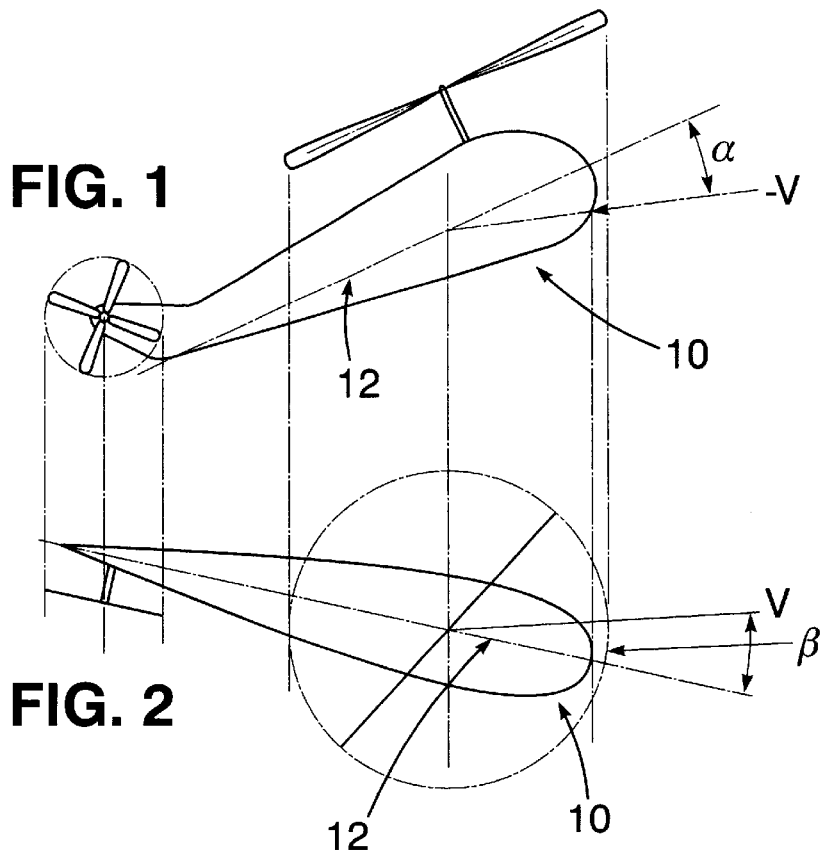
FIG. 1
FIG. 2
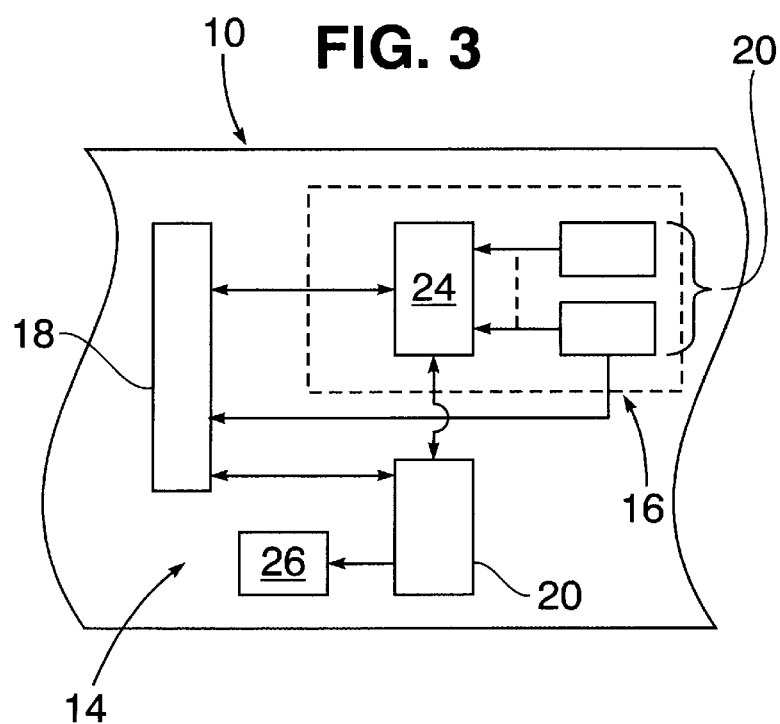
FIG. 3

NEURAL NETWORK SYSTEM FOR ESTIMATION OF AIRCRAFT FLIGHT DATA

The present invention relates generally to estimation of aircraft flight data, utilizing a neural network receiving inputs based on parameters measured or determined in a fixed reference frame, and is related to the disclosures in U.S. Pat. Nos. 5,751,609, 5,890,101 and 5,901,272.

BACKGROUND OF THE INVENTION

Air vehicles are designed for a wide variety of missions. Fighter and attack aircraft can operate at high speed and perform high-g maneuvers while helicopters operate primarily at lower speeds and perform maneuvers such as those associated with anti-submarine warfare, vertical replenishment, and search and rescue missions. Tiltrotor and tilt-wing aircraft have the capability to takeoff and land vertically but also achieve higher forward speeds than traditional helicopters. For all of these different types of aircraft, reliable airspeed data is required to maintain proper control of the aircraft. For fly-by-wire systems, airspeed in particular can be critical, with loss of the airspeed measurement resulting in the possibility of the aircraft going unstable.

Traditional airspeed systems consist of pressure sensors designed to measure total air pressure as well as static pressure as the aircraft moves through the air mass. Traditional air data sensors are costly and expensive to calibrate and maintain. Such airspeed systems must also be rugged enough to operate reliably in the harsh environment encountered by military aircraft. It is therefore an important object of the present invention to estimate airspeed by use of a low-cost, software-based approach.

In addition, traditional airspeed systems are not accurate when the resultant velocity is at a significant angle to the measurement probe. Therefore, when the aircraft nose is pointed in a direction substantially different from the direction in which the aircraft is moving, as in sideslipped or high angle of attack flight, the traditional airspeed sensor can be inaccurate. It is therefore another important object of the present invention to obtain data as to when an aircraft is operating at significant angles of attack and sideslip, by use of low cost means for determining airspeed, sideslip and angle of attack.

SUMMARY OF THE INVENTION

In accordance with the present invention, a system for simply, accurately and economically estimating aircraft flight data is provided using input parameters derived in the fixed reference frame of the aircraft fuselage. Specific examples of such flight data include aircraft airspeed, sideslip and angle of attack. Existing flight sensors can be used for measurement and supply of fixed frame parameters to a neural network through which the flight data estimates are calculated. The flight parameters can be further processed to provide indications to the pilot and ground crew of dangerous flight conditions such as stall, loss of tail rotor effectiveness and vortex ring state.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIGS. 1 and 2 are simplified side and top plan views of an aircraft (such as a helicopter) in air flight;

FIG. 3 is a block diagram of aircraft installed components of a system arranged in accordance with the present invention;

DETAILED DESCRIPTION OF PREFERRED EMBODIMENTS

Figure 4:
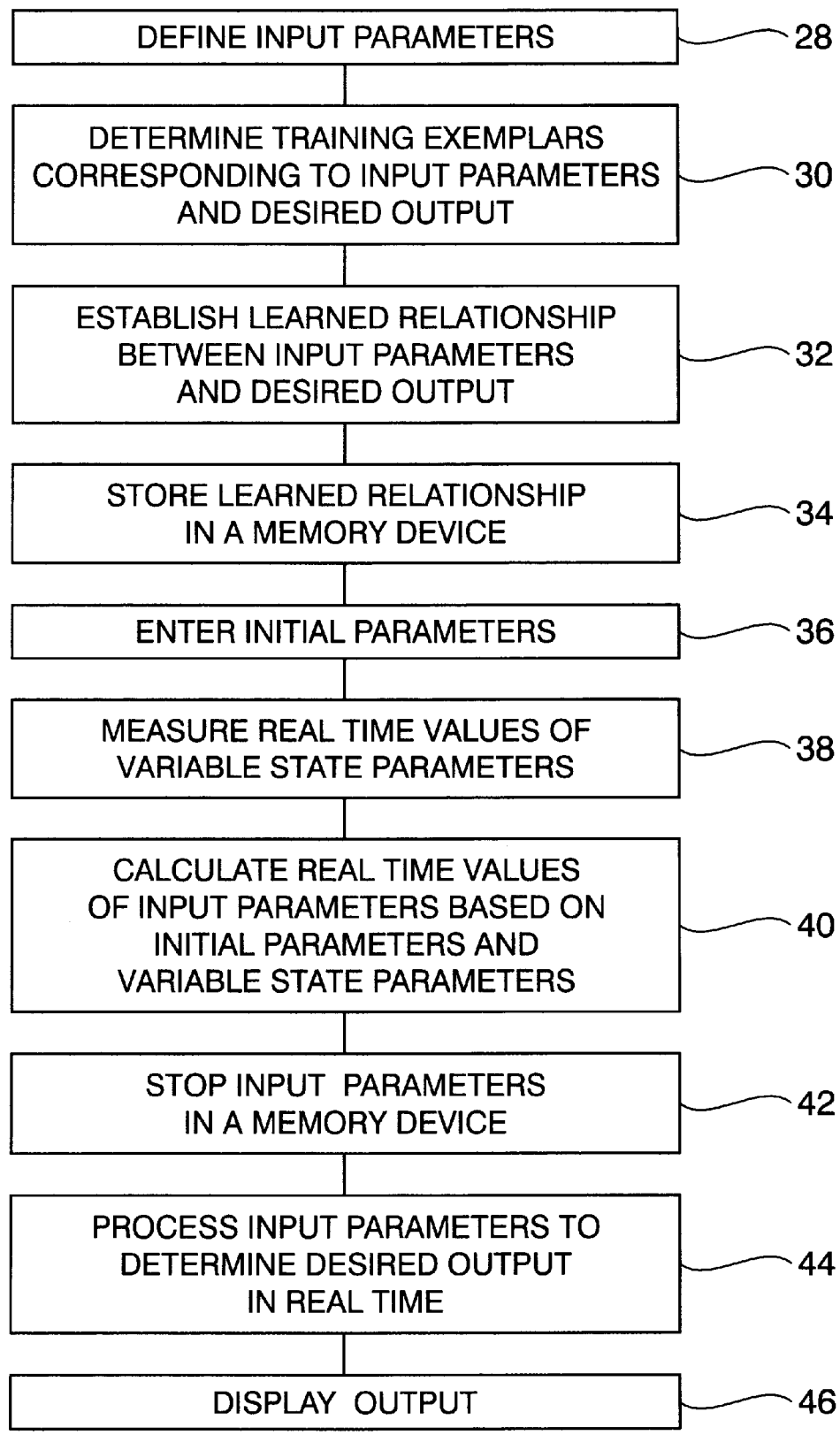
FIG. 4 is a flow chart of a method for practicing the present invention.

The present invention utilizes neural network technology for estimating airspeed, sideslip and angle of attack of aircraft. Such estimates are obtained from measurement or determination of parameters in a reference frame, fixed relative to the aircraft fuselage, as inputs to the neural network. As diagrammed in FIGS. 1 and 2, airspeed of an aircraft 10 is a measure of its resultant velocity (V) relative to the surrounding air, while angle of attack ($\alpha$) and sideslip angle ($\beta$) are measures of the angles at which the velocity vector (V) intersects the longitudinal axis 12 of the aircraft. According to one embodiment of the invention, a virtual sensor is provided employing neural networks for estimating the aircraft airspeed (V), sideslip angle ($\beta$) and angle of attack ($\alpha$) in real time fashion. A further embodiment provides a system for estimating such airspeed, sideslip angle and angle of attack in response to variable state parameters generated during aircraft flight and measured in a fixed (i.e. non-rotating) reference frame associated with the aircraft 10. Yet another embodiment provides a method for real time estimation of airspeed, sideslip angle and angle of attack with respect to aircraft 10 during its operation.

FIG. 3 symbolically depicts installation of the virtual sensor 14 (hereinbefore referred to) onboard aircraft 10. Such virtual sensor 14 includes: means 16 for: (a) determining the input parameters during flight; (b) generating successive signals representing such input parameters and at least one equation representing a nonlinear input-output relationship between the input parameters and a desired output in terms of airspeed, sideslip angle and angle of attack; (c) memory means 18 for storing said equations and optimally storing successively received signals from the determining means 16; and (d) a data processor 20 operatively coupled to the memory 18 for generating the desired output signals based on the input parameters and said equations, in response to signals received from the memory 18. The determining means 16 as diagrammed in FIG. 3, includes a number of measuring means 22 for respective measurement of the variable state parameters and calculator 24 for calculating the input parameters based on the signals generated by the measuring means 22 representing values of initial parameters and the variable state parameters. Such parameter signals determined by calculator 24 are transmitted to and from the memory 18 for calculation of the input parameter signals fed to the data processor 20 from which the generated output signals are transmitted to display means 26 for providing in response thereto an indication of the desired output.

According to the foregoing description of the determining means 16, the input parameters are derived from variable state parameter measurement during flight of the aircraft 10, while the desired output is estimated in a real time fashion by continuous updating at a predetermined sampling rate in order to provide measured values of the variable state parameters and calculated values of the input parameters as inputs to data processor 20. Appropriate sampling rates are typically 1 to 20 samples per second (Hz). Exemplary input parameters for use in accordance with the present invention may include: longitudinal cyclic stick position; lateral cyclic stick position; collective stick position; pilot pedal position; pitch attitude; roll attitude; pitch rate; roll rate; yaw rate; the torque measurement of at least one engine; at least one measured rotor rotational speed; and aircraft altitude. Other variable state parameters easily measurable by the measuring means 22 may be utilized including: fuel expended during flight; and static pressure and/or temperature of the surrounding air. The foregoing referred to variable state parameters are an indication of pilot control and aircraft response at certain times during flight measured in a non-rotating reference frame fixed to the aircraft fuselage, which thereby avoids the need for utilizing additional sensors or complicated methods of transferring data between the rotating rotor system to the fixed fuselage frame system. As to the neural network technology applicable hereto to estimate airspeed, angle of attack and sideslip angle, involving at least one equation, it is referred to in U.S. Pat. Nos. 5,751,609, 5,890,101 and 5,901,272 aforementioned.

A method for practicing the present invention is diagrammed in FIG. 4 utilizing apparatus as diagrammed in FIG. 3. Initially a neural network is trained to develop a nonlinear input-output relationship between input variables and a desired output by undertaking in sequence four steps 28, 30, 32 and 34 as diagrammed in FIG. 4. According to the first step 28, the user defines input parameters derivable from variable state parameters generated during aircraft flight and measured in the fixed aircraft fuselage frame. Next, a determination 30 is made of training exemplars to train the neural network. Such training exemplars include the input parameters defined by step 28 and corresponding airspeed, sideslip angle and angle of attack as the desired output either directly measured during test flights or determined from parameters measured during test flights. The data used to determine the training exemplars under step 30 is measured at a plurality of flight conditions representing a predetermined flight domain of the aircraft. Then under step 32, the neural network learns an input-output relationship between input parameters and the corresponding desired output, represented by at least one nonlinear equation, which is stored in a memory device onboard the aircraft under step 34. Once input-output equations are stored onboard the aircraft, only the variable state parameters need be measured to estimate airspeed, angle of attack and sideslip angle during aircraft operation.

The initial parameters used in calculating the input parameters are then entered into the memory device onboard the aircraft under step 36, followed by measurement of the variable state parameters through onboard sensors during aircraft operation under step 38 in the fixed reference frame of the aircraft. Under step 40, the input parameters are then calculated based on the entered initial parameters and the measured variable state parameters. Input parameters are then optionally stored in an onboard memory device under step 42, followed by processing in accordance with the stored nonlinear equation under step 44 to determine the desired output. Finally under step 46, the desired output is displayed for use by occupants of the aircraft and/or recorded by an aircraft monitoring system. The desired output is accordingly estimated and displayed in a real time fashion by continuous measurement of the variable state parameters at a predetermined sampling rate followed by calculation and data processing of the input parameters during aircraft flight.

Training of the neural network involves determination of a plurality of training exemplars respectively applicable to estimation of airspeed, angle of attack and sideslip angle within the expected flight domain of the aircraft, with corresponding input parameters and reference speeds. Such training of the neural network results in one or more neural network equations being learned, which are converted into executable computer language installed onboard the aircraft so that only input parameters need be determined based on initial parameters and easily measurable variable state parameters.

Data set selection is a critical aspect in developing a successful set of neural network architecture equations. Training exemplars are therefore selected and determined for any particular class or configuration of aircraft such as fixed wing aircraft, single rotor helicopters, tandem rotor helicopters and tilt rotor aircraft. Since the problem domain of the present invention is estimating airspeed, angle of attack and sideslip angle expected to be encountered during flight, the training exemplars should cover the combinations from a full range of airspeeds and angles to be encountered in the flight environment.

According to another embodiment of the present invention, a backpropagation (BP) type of neural network may be employed. Generally, a BP network comprises an input layer, one or more hidden layers and an output layer. Each hidden layer contains one or more processing elements (PE). At each PE, a transfer function with a corresponding connection weight is applied to develop a relationship between input and output vectors. Such transfer functions may be linear or nonlinear, although the nonlinear functions are preferred. The BP neural network architecture used for estimating airspeed, includes the input layer containing as the input parameters stick positions, pilot pedal positions, pitch and roll attitude, roll and yaw rates, engine torque, rotor speed and aircraft altitude. Also included in the BP network is an output layer containing estimated airspeed, angle of attack and sideslip, while nonlinear transfer functions are employed in the hidden layers. During network training, a random set of connection weights are applied to the input parameters entered into the network. The resulting network output of estimated airspeed is compared with measured reference values of speeds and angles of attack and sideslip. The error or difference between estimated and reference values is backpropagated through the connection weights which are appropriately adjusted. Such process is interactively repeated with new correction weights until the error is minimized.

In addition to development of a data set for training the neural networks as aforementioned, another data set is developed for testing the networks, involving assessment of the network equations developed from input and measured reference parameters. Training data was selected through use of an algorithm for a self-organizing feature map (SOFM), utilized to map a multi-dimensional input space into a two-dimensional grid. In one typical application flight data records are thereby mapped into 2500 SOFM bins. Several points from each bin were then selected to assemble the training data set. The test data set, on the other hand, consists of all data remaining in the 2500 SOFM bins after removal of the training data. Such test data is used to evaluate the network performance from data not previously trained on by the network, by providing a measure of how well the network generalizes.

A parametric neural network architecture study using the training data set determined the optimum architecture of the preferred BP neural network for estimating airspeed, angle of attack and sideslip based on the numbers of hidden layers and PE per layer of the BP network which were varied to provide-statistical parameters from which to determine the optimum architecture. Such statistical parameters are the root mean square (RMS) error and a correlation coefficient (R) as a linearity measure of the relationship between estimated airspeed and measured reference output. The (RMS) error provides a measure of the resulting error in predictions when entering the training or test data set into the network. The (RMS) error of the training data set will generally be good. Therefore, data in the test data set not previously encountered by the network is used to test optimization of the architecture for the BP neural network.

The nonlinear equations developed by such BP neural network are:

$$\text{Airspeed} = \sum_{k=1}^{x} u_k \tanh\left\{\sum_{n=1}^{z} W_{nk} \tanh(i_n)\right\}$$

$$\text{Sideslip Angle} = \sum_{k=1}^{x} a_k \tanh\left\{\sum_{n=1}^{z} X_{nk} \tanh(i_n)\right\}$$

$$\text{Angle of Attack} = \sum_{k=1}^{x} b_k \tanh\left\{\sum_{n=1}^{z} Y_{nk} \tanh(i_n)\right\}$$

where: $a_k$ represents the connection weight between the hidden layer processing element k and the sideslip output; $b_k$ represents the connection weight between hidden layer processing element k and the angle of attack output; $u_k$ represents the connection weight between the hidden layer processing element k and the airspeed output; $W_{nk}$, $X_{nk}$ and $Y_{nk}$ represents the connection weights between input n and the hidden layer processing element k for the various equations; and $i_n$ represents the input parameters. Also, the hyperbolic tangent function (tanh) is the BP network transfer function used in estimating airspeed and the angles of attack and sideslip. Thus, three sets of connection weights reflect the network success in mapping the input parameters to the output. The training which the network undergoes adjusts the connection weights. The summations from (k=1 to x) depend upon the number of PEs chosen for the hidden layer. In a preferred network with 30 PEs in the hidden layer, x=30. The summation from [n=1 to z] depends on the number of input parameters chosen. In a preferred network, with 12 input parameters, z=12.

Figure 5:
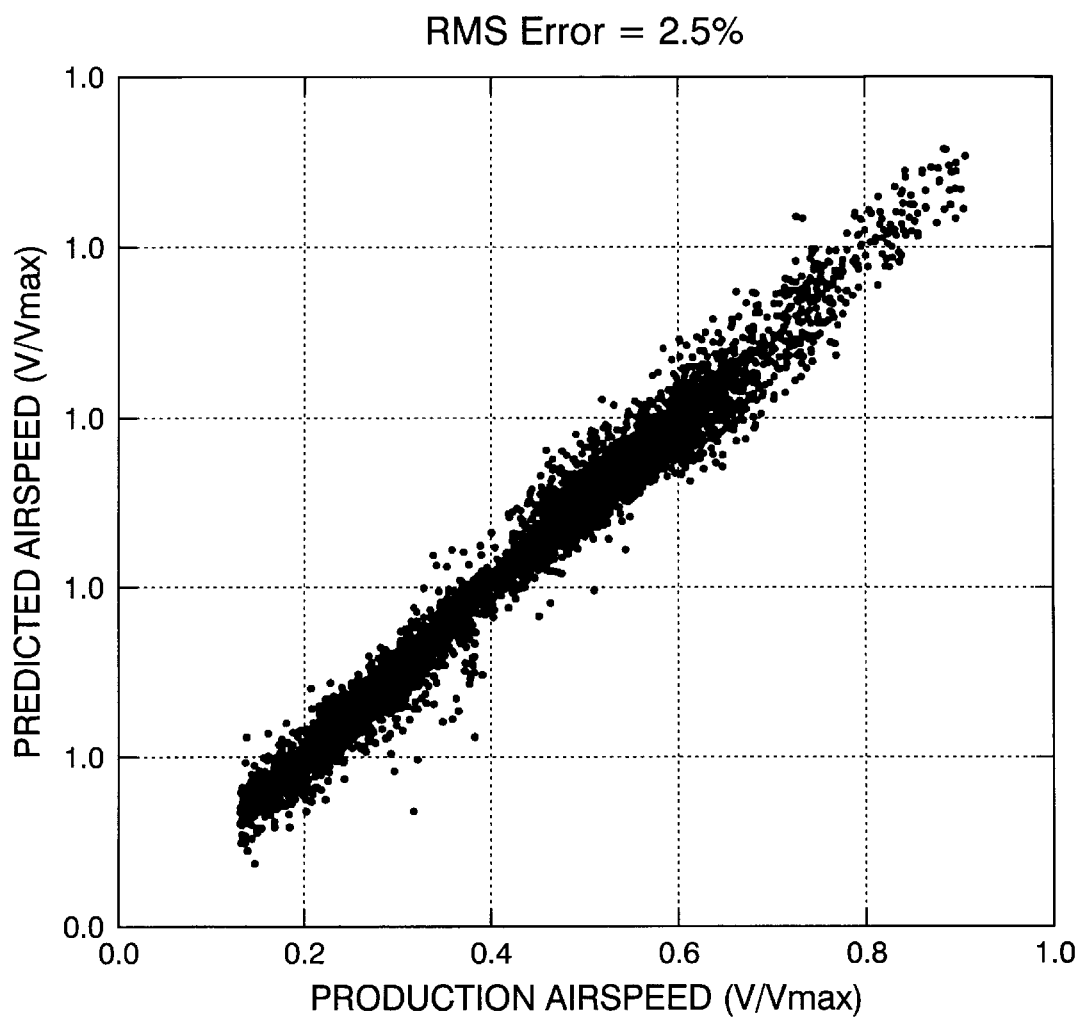
FIG. 5 is a graphical plot of preliminary airspeed predictions using a training data set containing a full range of airspeed data.
Figure 6:
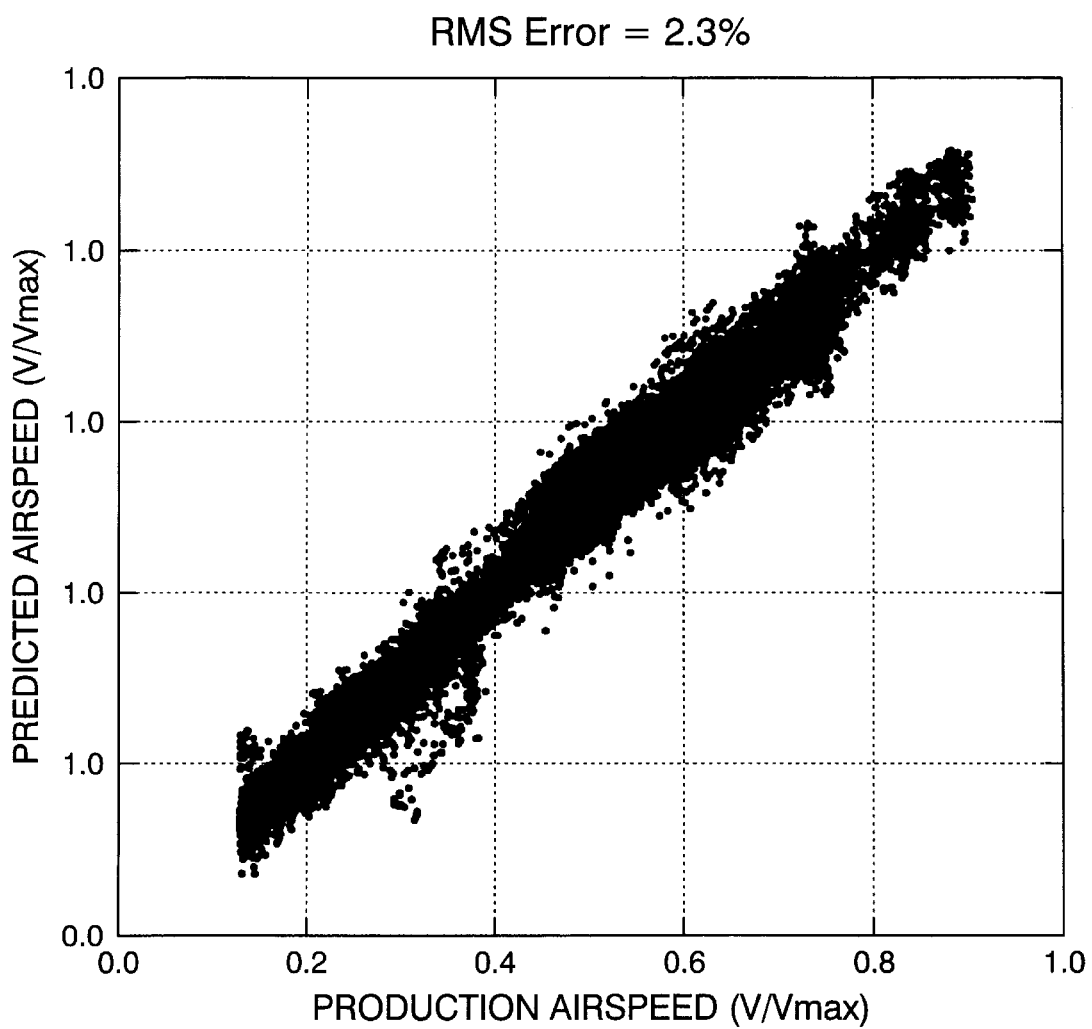
FIG. 6 is a graphical plot of airspeed predictions using test data sets containing a full range of airspeed data.

An estimation of airspeed based on input parameters and equations learned during training of a neural network with an optimized architecture as hereinbefore described is graphically depicted in FIG. 5 from results of its training data set. FIG. 6 on the other hand graphically presents prediction results for the test data set. From a statistical analysis of the training and test results respectively depicted in FIGS. 5 and 6, the accuracy of the network predictions were quantified. Thus, the accuracy of network predictions from the training data set was found to be ±5.0% while the accuracy on the test data set was ±4.7%, determined by calculations of an error band of 95.5% within which prediction data points fall (±2σ).

Figure 7A:
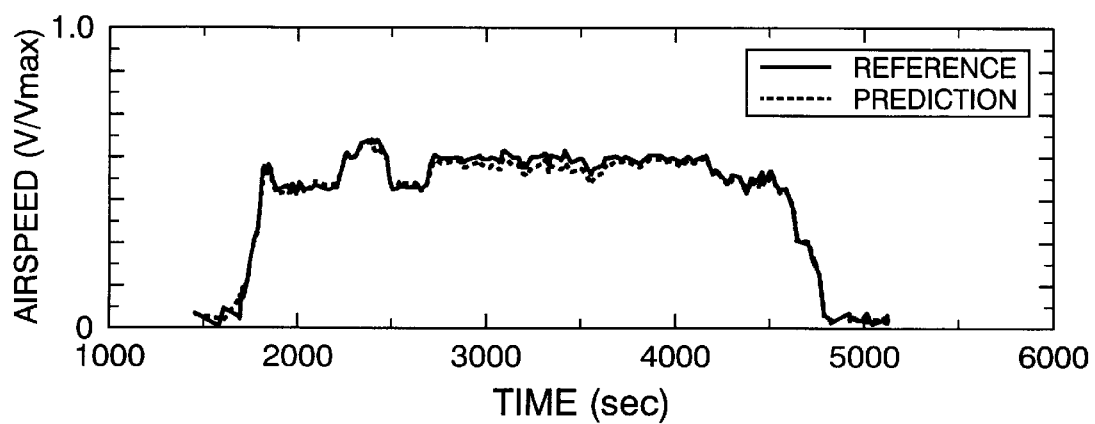
FIGS. 7A and 7B are graphical presentations of time history traces of airspeed predictions.
Figure 7B:
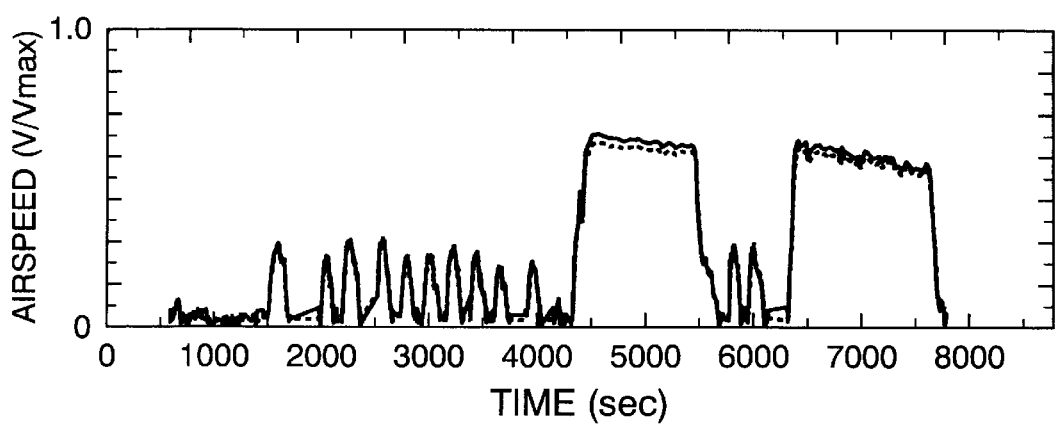

FIGS. 7A and 7B graphically plot time traces of airspeed throughout an aircraft flight. Such plots show reliable airspeed predictions with respect to time. The graphical plotting of reliable airspeed predictions can be extended to calculate the sideslip angle and angle of attack based on appropriate flight data, including input parameters and corresponding output parameters as hereinbefore described.

Obviously, other modifications and variations of the present invention may be possible in light of the foregoing teachings. It is therefore to be understood that within the scope of the appended claims the invention may be practiced otherwise than as specifically described.

What is claimed is:

1. A method for estimation of aircraft flight data during flight in a real time fashion, comprising the steps of:
    (a) defining input parameters derivable from variable data generated by aircraft sensors during said flight of the aircraft and measurable in a nonrotating reference frame associated with the aircraft;
    (b) determining said input parameters and coinciding reference data at a plurality of flight conditions representing a predetermined flight domain of the aircraft;
    (c) establishing a learned relationship between said determined input parameters and said coinciding reference data, represented by a plurality of nonlinear equations;
    (d) storing said nonlinear equations onboard the aircraft;
    (e) measuring real time values of said variable data during said flight of the aircraft;
    (f) calculating real time values of the input parameters; and
    (g) processing said real time values of the input parameters in accordance with said nonlinear equations to determine said estimation of the aircraft flight data, including angle of attack.

2. The method as defined in claim 1 including the step of: processing said estimation of the aircraft flight data to enhance pilot awareness of situation and provide indications of dangerous flight conditions to the pilot and ground crew.

3. The method as defined in claim 1 wherein said input parameters may include: pilot control; position settings; pitch and roll attitudes; pitch, roll and yaw rates; engine torque; rotor rotational speed and aircraft altitude.

4. The method as defined in claim 1, wherein the nonlinear equation from which estimation of the angle of attack is determined is:

$$\sum^{x} b \tanh\left\{\sum^{x} Y_k \tanh(\text{in})\right\}.$$

5. A method of determining flight data of an aircraft, comprising the steps of: measuring variable data generated by sensors during flight of the aircraft in a nonrotating reference frame associated with the aircraft; determining a plurality of input parameters based on said measurement of the variable data; storing said plurality of the input parameters in a memory; and processing said plurality of the input parameters within a neural network trained with a plurality of exemplars corresponding to the, variable data and reference aircraft parameters, said exemplars being measured at a plurality of flight conditions of the aircraft including angle of attack representing a predetermined flight domain thereof.

6. The method as defined in claim 5, wherein said neural network is responsive to values of the variable data not previously encountered for deriving the flight conditions including said angle of attack of the aircraft based upon the input parameters.

7. The method as defined in claim 5, including the step of: providing indications of dangerous flight conditions, including stall, loss of tail rotor effectiveness and vortex ring state.

* * * * *